United States Patent [19]

Robeck et al.

[11] Patent Number: 5,048,024
[45] Date of Patent: Sep. 10, 1991

[54] PARTITIONED PARITY CHECK AND REGENERATION CIRCUIT

[75] Inventors: Gary R. Robeck, Albertville; Joseba M. Desubijana, Minneapolis, both of Minn.

[73] Assignee: Unisys Corporation, Blue Bell, Pa.

[21] Appl. No.: 403,638

[22] Filed: Sep. 6, 1989

[51] Int. Cl.$^5$ .............................................. G06F 11/10
[52] U.S. Cl. .................................................. 371/49.1
[58] Field of Search ............... 371/49.1, 49.2, 49.3, 371/49.4, 51.1; 364/200 MS File, 900 MS File

[56] References Cited

U.S. PATENT DOCUMENTS

| | | | |
|---|---|---|---|
| 4,371,929 | 2/1983 | Brann | 364/200 |
| 4,443,876 | 4/1984 | Ng | 371/49.2 |
| 4,456,976 | 6/1984 | Savage | 364/900 X |
| 4,462,102 | 7/1984 | Povlick | 371/49.2 |
| 4,556,978 | 12/1985 | Kregness | 371/49.1 |
| 4,697,233 | 9/1987 | Scheuneman | 371/24 X |
| 4,706,250 | 11/1987 | Patel | 371/51.1 X |

Primary Examiner—Robert W. Beausoliel
Attorney, Agent, or Firm—John W. Sowell; Glenn W. Bowen; Mark T. Starr

[57] ABSTRACT

A novel partitioned parity check and regeneration circuit is provided for receiving an input data word which is partitioned and the partitioned bits are stored in a partitioning register to provide a subset input data word of fewer data bits than the input data word. Parity register means including a parity register are associated with the partitioning register to provide a parity check of the partitioned data word and for generating an error detect signal when the data bits in the partitioning register are not properly latched. The parity bits stored in the associated parity register are employed with associated output logic to generate regenerated parity bits associated with the output of the data bits in the partitioning register to preserve the integrity of the data.

8 Claims, 5 Drawing Sheets

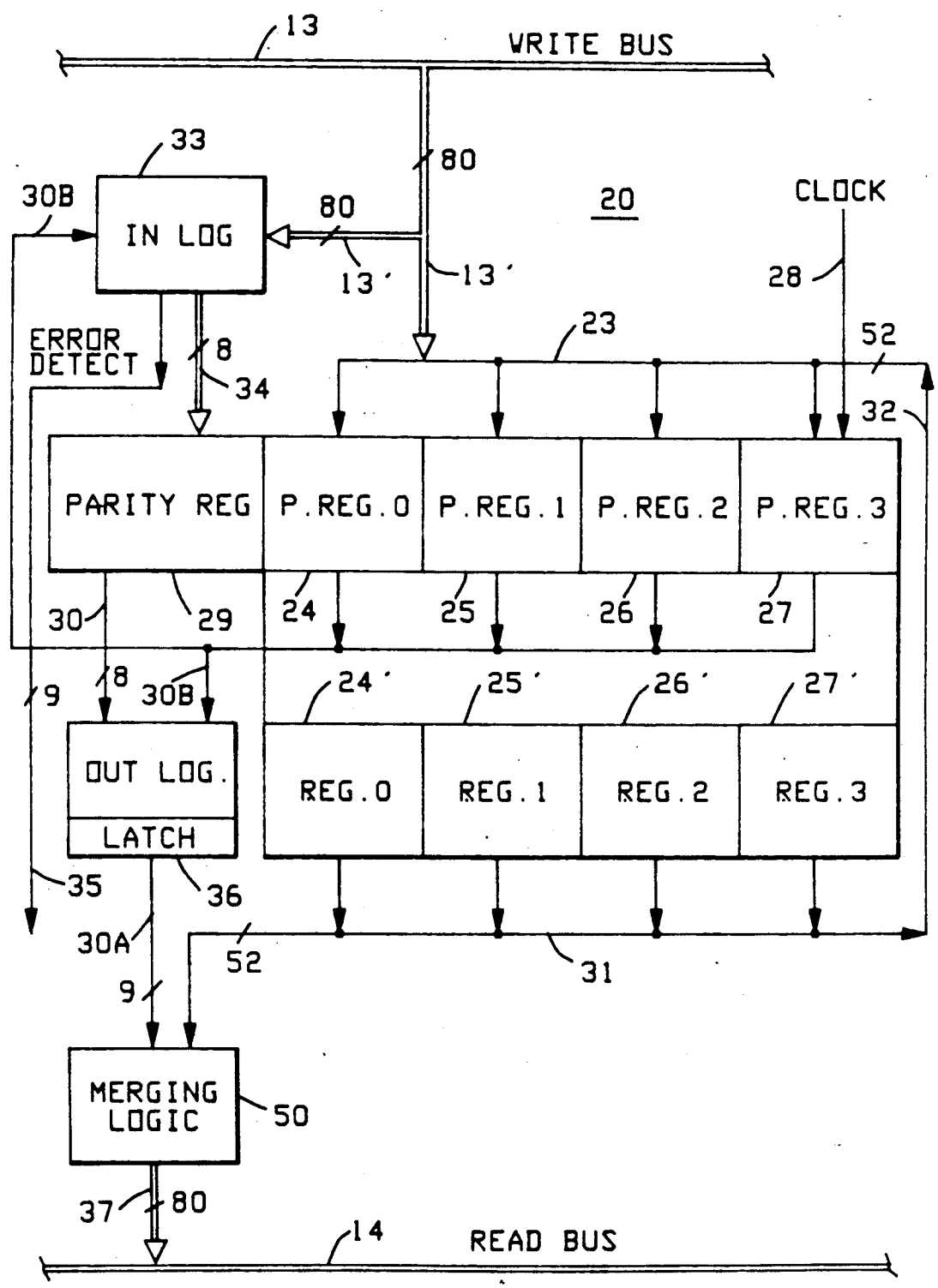

PARTITIONED PARITY CHECK AND REGENERATION CIRCUIT

BACKGROUND OF THE INVENTION

1. Field of the Invention

The present invention relates to parity checking circuits for high speed mainframe computers. More particularly, the present invention relates to novel parity checking and regeneration parity circuits of partitioned data.

2. Description of the Prior Art

Parity checking circuits are well known and were included in the earliest electronic computer systems. Such circuits were employed at critical data paths throughout the computing system in order to validate the integrity of the data in the computing system.

Modern high speed mainframe computers attempt to employ parity checking circuits throughout the computing system wherever practical. Heretofore, partitioned registers have been employed in high speed mainframe computers. Such partitioning registers strip off or truncate data bits from data words or assimilate data bits to form a shortened data word and do not provide input or output parity checking of the shortened data, thus, any use of partitioned registers in critical data paths of a high speed computer have exposed the computing system to parity errors without means for checking such errors.

It would be desirable to provide simplified high speed parity checking logic for partitioned data, buffered or stored in partitioning registers throughout a high speed mainframe computing system.

SUMMARY OF THE INVENTION

It is a principal object of the present invention to provide a novel partitioned parity checking and parity regeneration circuit.

It is another principal object of the present invention to provide circuits for partitioning data from a larger input data word and providing parity error check and parity regeneration in two phases of a minor machine cycle time.

It is another principal object of the present invention to provide parity check and regeneration circuits which are operable in real time during input and output of a partitioning register or registers.

It is a general object of the present invention to provide novel parity checking circuits for use in a high speed computing system employing partitioned data anywhere in the computing system.

It is yet another general object of the present invention to provide simplified and novel parity checking and regeneration circuitry definable by Boolean algebra or Boolean equations which enables circuit designers to implement a simplified design program for designing variations of partitioned data registers.

According to these and other objects of the present invention, there is provided a partitioning register comprising buffer registers for storing selected data bits partitioned from an input data word to provide a subset input data word of fewer data bits than the original input data word. The partitioning register further comprises a parity register which contains a plurality of parity bits associated with the subset input data word and there is further provided input logic means for generating the parity bits stored in the parity register of the partitioning register. The input logic further provides means for detecting an error in the data bits stored in the subset input data word.

BRIEF DESCRIPTION OF THE DRAWINGS

FIG. 2 is a block diagram of a day clock counter circuit of the type employed in the support control card of the computer system shown in FIG. 1;

DESCRIPTION OF A PREFERRED EMBODIMENT

Figure 1:
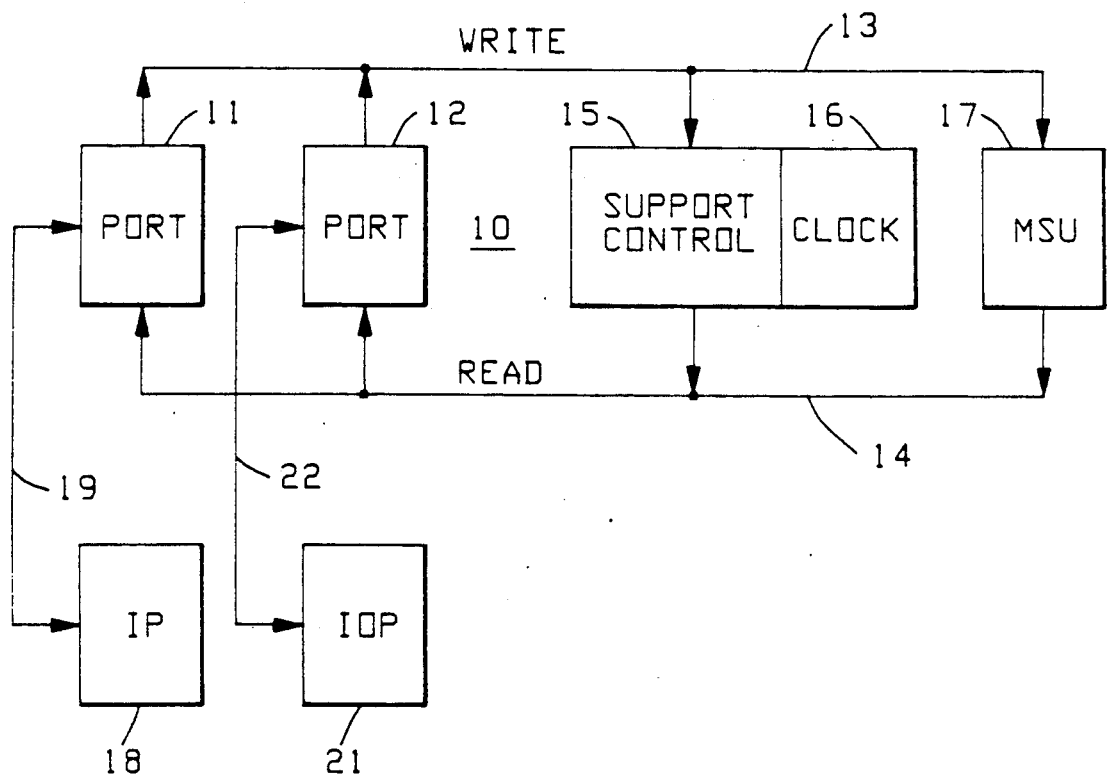
FIG. 1 is a simplified block diagram of a computer system showing an arrangement of processors and the interconnections for accessing a main storage unit.

Refer now to FIG. 1 showing a simplified block diagram of a computer system 10 having port cards 11 and 12 connected via write bus 13 and red bus 14 to a support control card 15 which includes a day clock 16. A main storage unit 17 is provided on the read and write bus and is accessible to an instruction processor 18 via its bus 19 and an input/output processor 21 via its bus 22. While other components may be connected to the system, such as peripheral devices, through the I/O processor 21, they need not be explained for purposes of the present invention.

Refer now to FIG. 2 showing a block diagram of a preferred embodiment of the present invention illustrated with a day clock counter circuit of the type employed in the support control card 15 of FIG. 1. The day clock counter circuit best illustrates two variations of the present invention partitioning circuit 20 which is connected to the aforementioned write bus 13. In a preferred embodiment of the present invention, a data word comprising eighty bits is presented on bus 13' to load path 23 where selected bits are presented in a subset for partitioning register shown as partitioning registers O-3 also numbered 24-27, respectively. The PO register 24 is the highest order register. The P3 register 27 is the lowest order register and is shown having a clock input 28 connected to the register at the lowest order partitioned data bit. Since the present invention is being explained in conjunction with a day clock counter, the four partitioning registers 24-27 provide a "master" partitioning register having an associated parity register 29. The "slave" register comprises an identical copy of the data bits in the master register in the same register format having registers 24-27 arranged in the highest order to lowest order bit configuration from register O to register 3, respectively. The output from the slave partitioning register 24'-27' is applied to a data path 31 having a feedback loop 32 which feeds the identical information from the slave output partitioning register 24'-27' back to the master input partitioning register 24-27.

The original input data word on bus 13' is also applied to input logic 33 to provide a unique eight bits of parity information via line 34 to the parity register 29. Further, input logic 33 provides a nine bit error detection signal on line 35 if the data in the master input partitioning register contains a parity error. The purpose of the error detection signal on line 35 is to confirm that the data latched into the master partitioning register 24-27 via line 30B is error free. Thus, it will be appreciated that other parity checking circuits have already confirmed that the data being presented on bus 13' has been parity checked and is presumable error free. A more detailed description of how the information latched in the master input partitioning register 24-27 can be validly checked will be explained in more detail hereinafter.

Assuming that the master input partitioning register 24-27 information has been transferred to the slave partitioning register 24'-27' and is capable of presenting 52 bit output data on data path 31, the identical information will be presented at the input of merging logic 50 along with the nine parity bits on line 30A which are outputted from output logic 36 thus providing a sixty-one bit input to merging logic 50. As will be explained hereinafter, the output logic 36 regenerates nine new parity bits associated with the 52 bits of data presented on output data path 30B. Further, merging logic 50 provides an eighty bit output data word on bus 37 to read bus 14.

Figure 3:
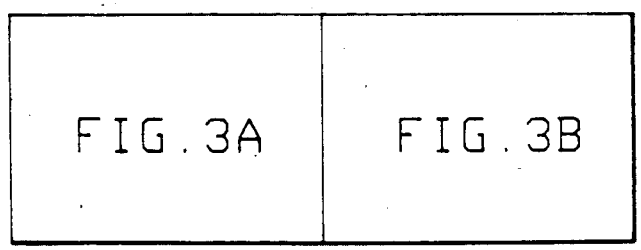
FIGS. 3A and 3B are a block diagram of one of the partitioning registers of the partitioning register means and the associated input logic therefor.
Figure 3A:
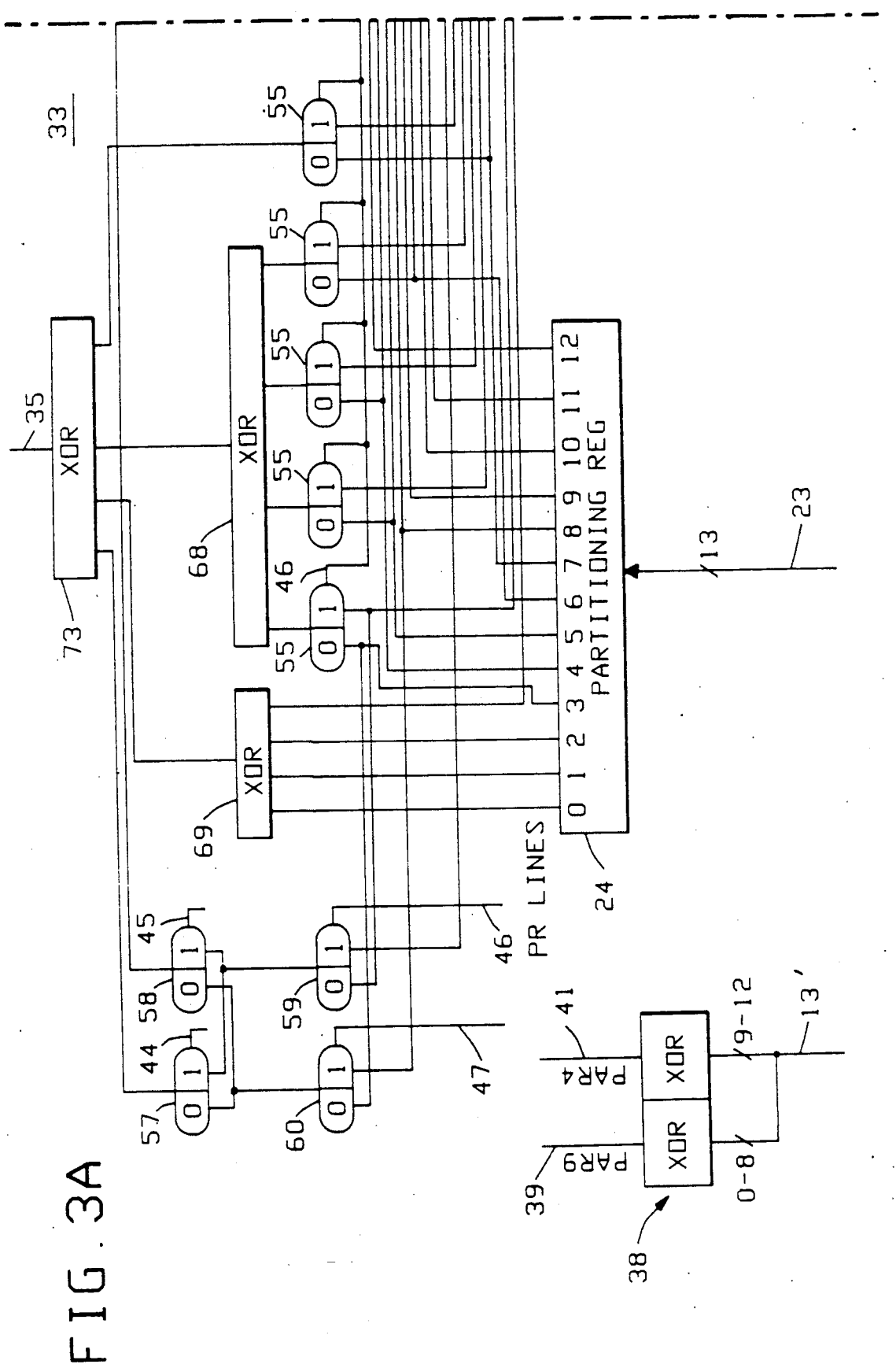
Figure 3B:
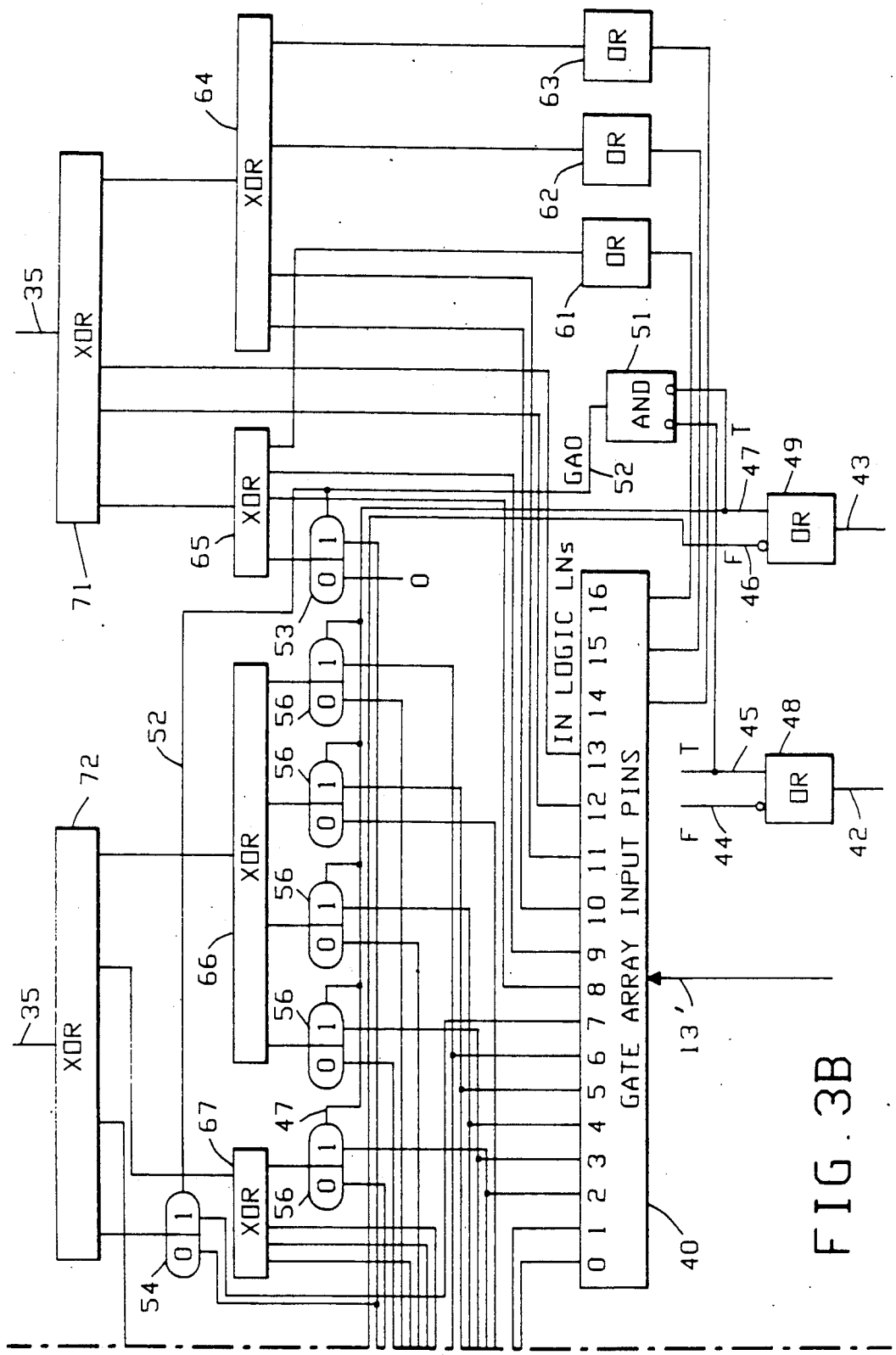

Refer now to FIG. 3 showing the highest order partitioning register 24 and its associated input logic 33. In the preferred embodiment of FIG. 3, the input logic 33 has been implemented on a single VLSI integrated circuit which includes partitioning register 24. The data to be latched into partitioning register 24 is presented via input data path 23, also shown in FIG. 2. The data on line 23 is shown as latched data on the PR LINES, also shown on line 30B in FIG. 2. The unlatched data is presented to the input pins 40 of the gate array, comprising input logic 33, via bus 13'. All eighty bits of the input data word on line 13' are presented to the input data logic 33 along with the PR LINE output of the partitioning register 24 and is employed to check the parity of the each individual partitioning register. The data on bus 13' is shown connected to an exclusive OR gate 38 and having its data to be latched input bits O-8 applied to a first exclusive OR circuit and having its data to be latched input bits 9-12 applied to a second exclusive OR circuit. The output of the first exclusive OR circuit provides a single parity 9 bit designated PAR 9 on line 39. Similarly, the PAR 4 parity bit on line 41 provides a second parity bit for use in the output logic to be explained hereinafter.

Input logic 33 is provided with a multiplexer (MUX) address generation device which generates two bits designating addresses indicating the four different partitioning registers 24-27. The predetermined address bit designations are presented on lines 42 and 43. In the present invention, the address on line 42 is a zero bit and the address on line 43 is also a zero. By predetermined assignment OO represents the partitioning register 24. The address OO on lines 42 and 43 cause line 45 of OR gate 48 to be zero or true, reflecting the same input, and the line 44 to be high reflecting the inverted or false input. Similarly, the zero input on the one address side, at line 43, causes false line 46 of OR gate 49 to be high and line 47 to be low. The true side of OR gates 48 and 49 on lines 45 and 47 are applied as inputs to AND gate 51 to produce an indicator signal on line 52 which identifies the partitioning register 24. It will be understood that the other partitioning registers will have other indicating signals for their registers 25-27. The indicator signal on line 52 is shown being applied to the address inputs of the two input MUXs 53 and 54. In a similar manner, the false and true signals on lines 46 and 47 are shown being applied to the address inputs of identical two input MUX circuits 55 and 56, respectively. In a similar manner, the signals on lines 44-47 are shown being applied to the address inputs of identical two input MUX circuits 57-60, respectively, as shown. Partitioning register 24 provides thirteen output lines herein referred to as PR lines O-12. The unlatched data input on line 13' entering the input logic 33 provides input logic lines O-16. It will be noted that the input logic lines 14 to 16 are connected to buffer OR gates 61-63 having their outputs applied to four input exclusive OR gates 64, 65 along with logic inputs from lines ILL 10, 11; 8, 9 and MUX 53. Four input exclusive OR gates 65-69 also receive four inputs from the PRL lines or the ILL lines or the MUXs 53, 55 and 56. The outputs from the first order exclusive OR gates 64-69 are applied to a plurality of second order exclusive OR gates 71-73 to provide three single parity bits on lines 35 which comprise the error detect signals for partitioning register 24. Other inputs to gates 71-73 are as shown. It will be understood that partitioning registers 25-27 generate two parity detect parity bits on their error detect lines 35. The partitioning registers 25-27 only require two parity error detectors and do not use the error detect bit output from exclusive OR circuit 71. Thus, it will be understood that the combined logic shown in FIG. 3 is employed only for partitioning register 24 and that the logic which generates the output on lines 35 from exclusive OR registers 72 and 73 is duplicated for each of the partitioning registers 25-27 so that the input logic 33 generates nine bits on lines 35 as shown in FIG. 2.

Figure 4:
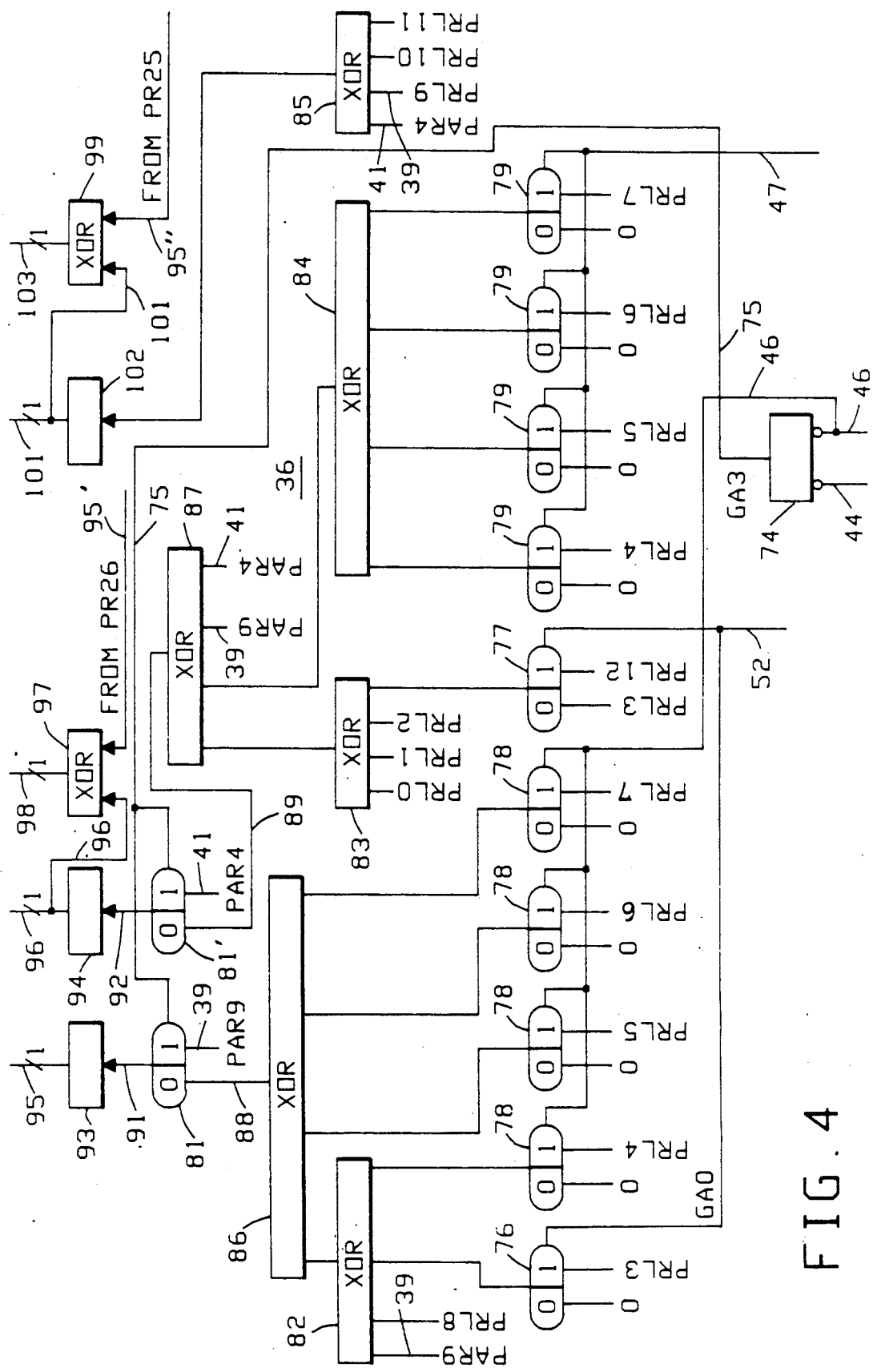
FIG. 4 is a block diagram of the output logic including the regeneration circuits which are associated with the partitioned data word upon output to a read bus.

Refer now to FIG. 4 showing a block diagram of the preferred embodiment output logic 36. The address indicator lines 44 and 46 described in FIG. 3 are shown being applied to the input of AND gate 74 to produce a true partitioning register 27 indicator signal on line 75. The partitioning register 24 indicator signal on line 52 in FIG. 3 is shown being applied to the address inputs of two input MUXs 76 and 77. The indicator input signals on lines 46 and 47 are shown being applied to the address inputs of the two input MUXs 78 and 79, respectively. The true indicator signal on line 75 for partitioning register 27 is shown being applied to two input MUXs 81, 81'. The inputs from the partitioning register lines (PRL 3-7 and 12) are shown being applied to the data inputs of MUXs 76-79 along with no input or zero signals as shown. The output signals are applied to the first order exclusive OR gates 82-85 as shown. The inputs to X-OR gates 82-85 further comprise the aforementioned PAR 4 and PAR 9 signals on lines 41, 39 and the PRLO to PRL2 and PRL8-PRL11 inputs as shown. The signals from the first order exclusive OR gates 82-84 are shown being applied to the two second order exclusive OR gates 86 and 87 with other inputs, previously identified. The outputs from the second order exclusive OR gates 86-87 on lines 88 and 89 are applied to the two input MUXs 81, 81' having different second inputs from lines 39 and 41, respectively. The output from the MUXs 81, 81' on lines 91 and 92 are applied to parity latches 93 and 94, respectively, to produce individual single regenerated parity bits on lines 95 and 96, respectively. The signal on line 96 is applied as an input to third order exclusive OR gate 97 to produce the regenerated parity bit signal on line 98. It will be understood that the second input on line 95' to gate 97 is from the parity latch 93' which is in the gate array or register which contains the logic for partition register 26 (now shown). In similar manner, the signal on line 95" from the logic of partitioning register 25 is applied to the input of exclusive OR gate 99 along with the output signal on line 101 from the parity latch 102 which is coupled to the output of the first order exclusive OR gate 85 as shown. The regenerated parity bit on output line 101 is a single regenerated parity bit as is the single regenerated parity bit on line 103 from exclusive OR gate 99. Eight of the nine regenerated parity bits are generated on four pairs of lines like 95, 96 and a ninth bit on line 101. The other regenerated parity bits on lines 98 and 103 are employed in the present logic to reduce the number of parity bits presented via bus 37 to the read bus 14.

Having explained a preferred embodiment, partitioned parity check and regeneration circuit employing a day clock counter 16 shown in greater detail in FIG. 2, it will be appreciated that the input partitioning registers 24–27 together with the associated parity register 29 may be employed without the associated output partitioning registers 24' to 27' in other parts of a high speed computing system to accomplish the same desired results described hereinbefore.

It will now be appreciated that the logic diagram of FIG. 2 requires four gate array circuits having the logic shown in FIGS. 3 and 4. Only one of the partitioning registers 24–27 is represented by the FIGS. 3-4 logic. Each register 24–27 requires only a fourth or a 2 bit part of the parity register 29 shown at gates 38. Each 2 bit register 29 is included in each of the gate arrays to provide an eight bit parity output on line 30. Further, the third order exclusive OR gates 97 and 99, shown on FIG. 4 as being part of the output logic 36, may be included in the merging logic 50 of FIG. 2 gate array or may be provided as discrete circuitry located between the merging logic 50 and the output logic 36.

The gate arrays employed to produce the circuitry shown in FIGS. 3 and 4 were provided with a 120 input/output pins. Thus, it will be understood that much larger very large scale integrated circuits (VLSI) having over 240 input/output pines would enable a circuit designer to incorporate all of the necessary logic shown in FIG. 2 on a single chip.

The partitioned parity check circuit checks and regenerates parity. In the circuit shown for a day clock counter 52 of the 72 bits of a data field and 8 parity bits are checked by exclusive ORing all latched and unlatched data of a parity field with its parity bit. The parity bits for the latched data are regenerated on the appropriate fields, thus, the data integrity is preserved even though the parity domain boundaries may vary from one partitioning register to another.

What is claimed is:

1. A partitioned parity check and regeneration circuit, comprising:
   an input data word comprising a plurality of bytes, each said byte comprising plural data bits and a parity bit,
   partitioning register means comprising buffer registers for storing selected data bits from said input data word to provide a subset input data word of fewer data bits than said input data word,
   parity register means containing a plurality of parity bits associated with each said subset input data word, and
   input logic means for generating said parity bits,
   said input logic means having all of the inputs of said input data word, and
   having an error detecting output and a parity bit output for loading said parity register means.

2. A partitioned parity check circuit as set forth in claim 1 wherein said partitioning register means comprises a day clock counter,
   said day clock counter having two orders of partitioning registers, a master input partitioning register, and a slave output partitioning register.

3. A partitioned parity check circuit as set forth in claim 2 which further comprises a return loop coupled from the output of said slave output register and to the input of said master input register.

4. A partitioned parity check circuit as set forth in claim 3 which further comprises a day clock signal coupled to the lowest order bit register of the lowest order bit in said master input register comprising said lowest order bit register.

5. A partitioned parity check circuit as set forth in claim 1 which further includes output logic means coupled to the output of said partitioning register means and to said parity register means for generating an output data word having the same bit and byte length as said input data word.

6. A partitioned parity check circuit as set forth in claim 5 wherein said output logic means includes means for generating zero filled data bits.

7. A partitioned parity check circuit as set forth in claim 6 wherein said zero filled data bits are inserted at predetermined bit positions of said output data word.

8. A partitioned parity check circuit as set forth in claim 7 wherein the majority of said zero filled bits are inserted in consecutive bit positions at the highest order bit positions.

* * * * *